United States Patent [19]

Satzler et al.

[11] Patent Number: 5,286,044
[45] Date of Patent: Feb. 15, 1994

[54] BELTED MULTI-PURPOSE TRAILER

[75] Inventors: Ronald L. Satzler, Princeville; Edward E. Schmillen, Metamora, both of Ill.

[73] Assignee: Caterpillar Inc., Peoria, Ill.

[21] Appl. No.: 10,902

[22] Filed: Jan. 29, 1993

[51] Int. Cl.$^5$ .................. B62D 55/06; B62D 55/30; B60G 11/22
[52] U.S. Cl. .................. 280/28.5; 280/716; 180/9.54; 180/9.1; 305/31
[58] Field of Search .................. 180/9.1, 9.4, 9.5, 9.54; 280/656, 789, 676, 687, 688, 716, 28.5; 305/21, 22, 24, 28, 29, 31

[56] References Cited

U.S. PATENT DOCUMENTS

| 1,026,091 | 5/1912 | Holt | 180/9.54 |
|---|---|---|---|
| 1,278,931 | 9/1918 | Houghton | 280/28.5 |
| 1,309,578 | 7/1919 | Holt | 180/9.54 |
| 1,450,466 | 4/1923 | Turnbull | 280/28.5 |
| 2,809,703 | 10/1957 | Hayes | 180/9.54 |
| 2,971,771 | 2/1961 | Jewell | 280/676 |
| 3,170,531 | 2/1965 | Katzenberger | 180/9.2 |
| 3,481,623 | 12/1969 | Campbell | 280/716 |
| 3,924,703 | 12/1975 | Purcell | 180/9.54 |
| 4,253,536 | 3/1981 | Braathen | 180/9.5 |
| 4,789,181 | 12/1988 | Baxter | 280/687 X |
| 4,854,650 | 8/1989 | Getz et al. | 305/31 X |
| 4,923,257 | 5/1990 | Purcell | 305/29 |
| 5,127,714 | 7/1992 | Satzler | 305/60 |
| 5,191,951 | 3/1993 | Bargfrede et al. | 180/9.1 |

Primary Examiner—David M. Mitchell
Assistant Examiner—Peter English
Attorney, Agent, or Firm—Claude F. White

[57] ABSTRACT

A belted multi-purpose trailer vehicle has first and second roller frame assemblies and a main support frame assembly. The roller frame assemblies are connected to the support frame assembly by first, second, and third quick release connecting mechanisms. These mechanisms provide rapid and easy assembly and disassembly of the roller frame assemblies to the support frame. Many farm operations require several different trailer-type vehicles to perform the various work functions. The subject multi-purpose trailer vehicle uses a single belted undercarriage easily connectable to a plurality of cargo and hauling beds or carts. This eliminates the need to have a plurality of separate complete trailer vehicles, each with their own running gear or ground supporting assemblies.

18 Claims, 7 Drawing Sheets

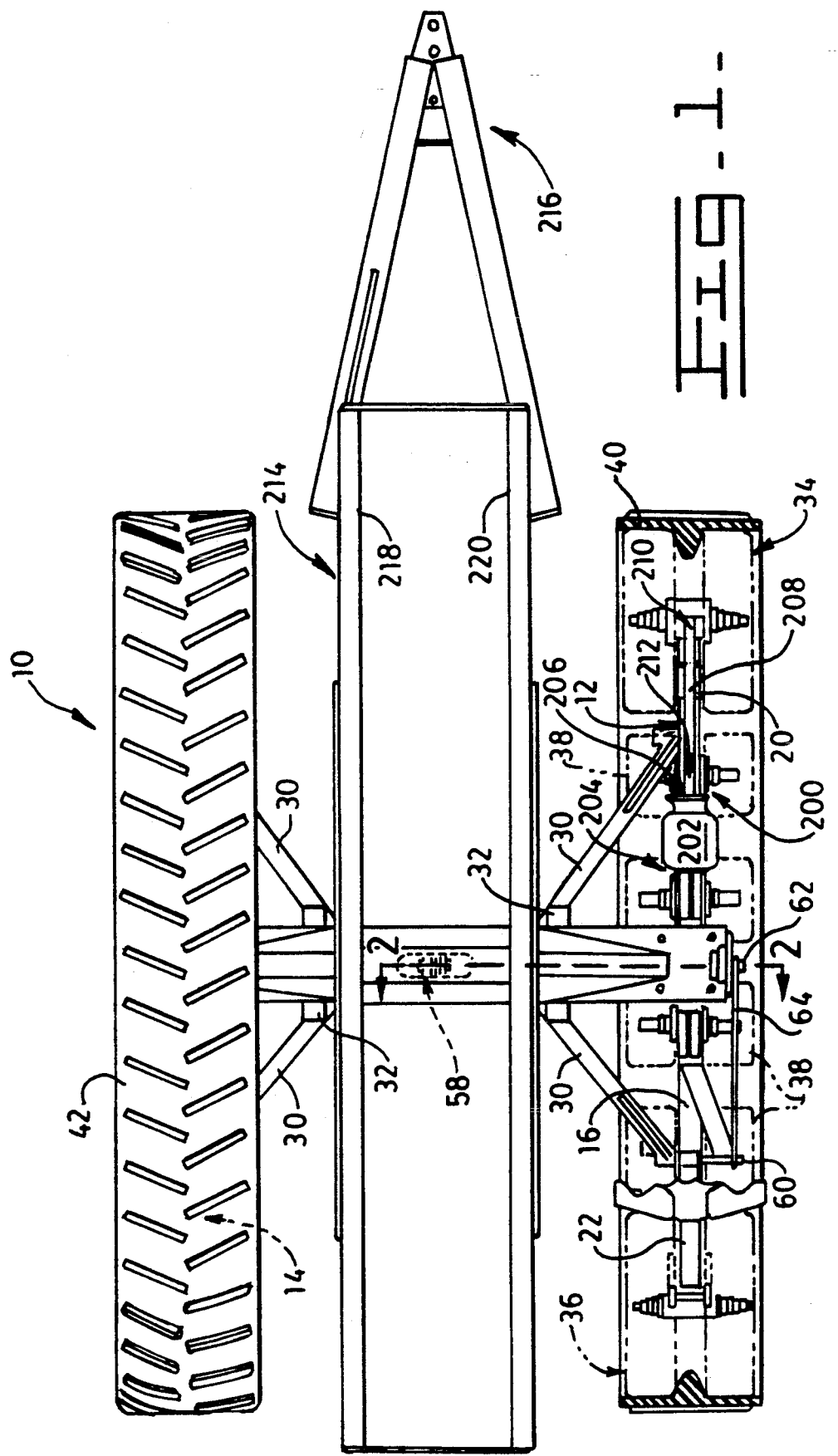

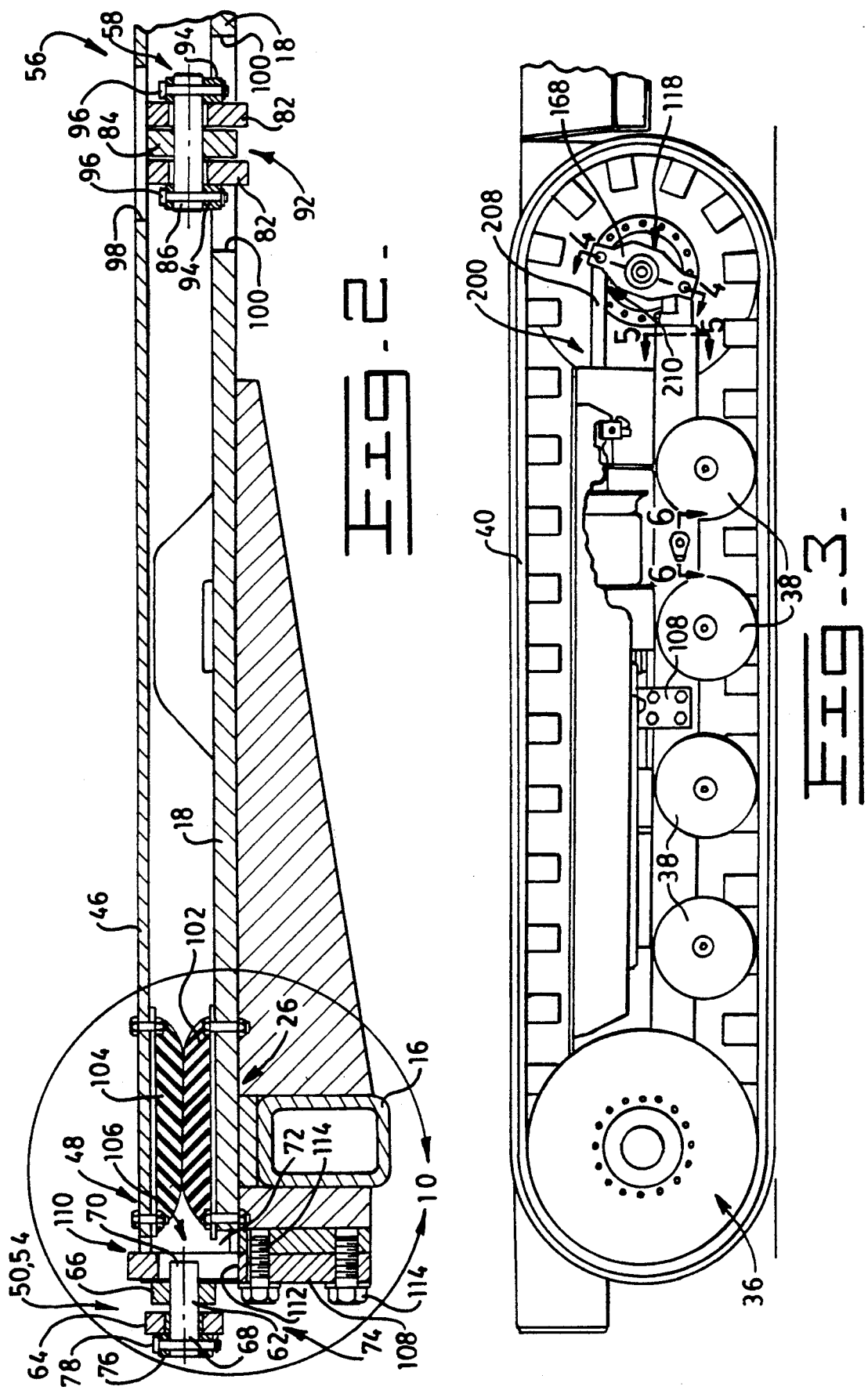

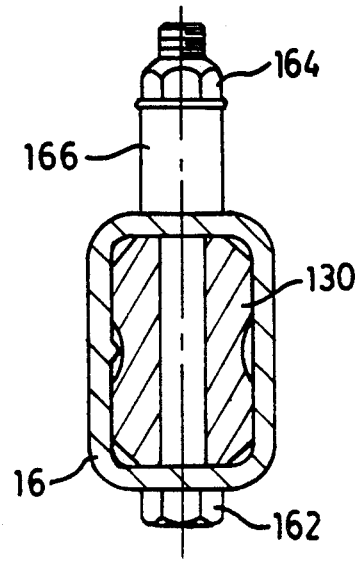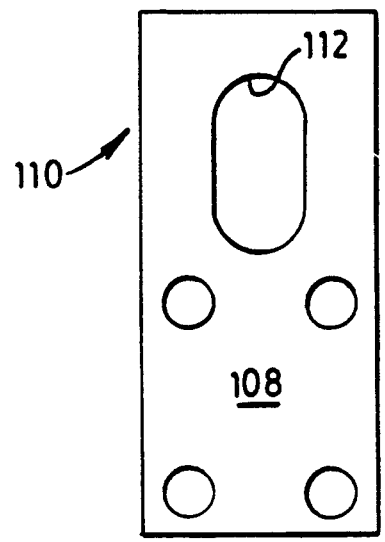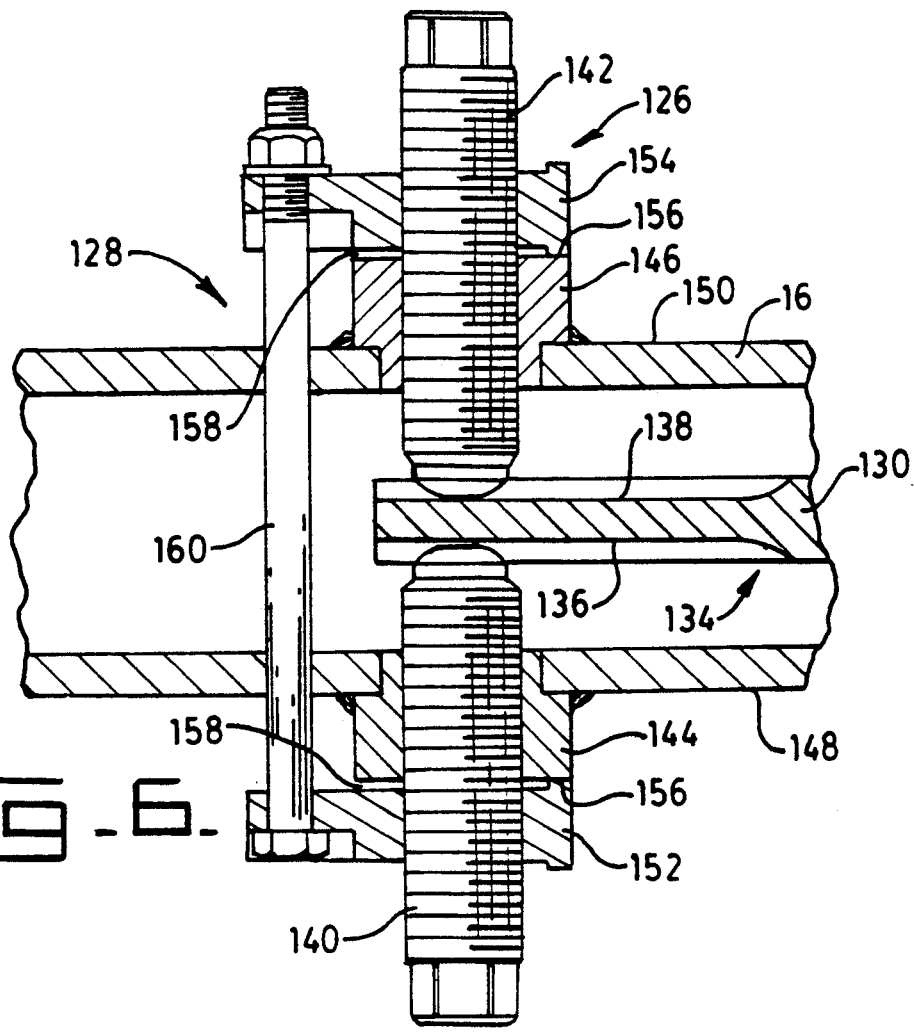

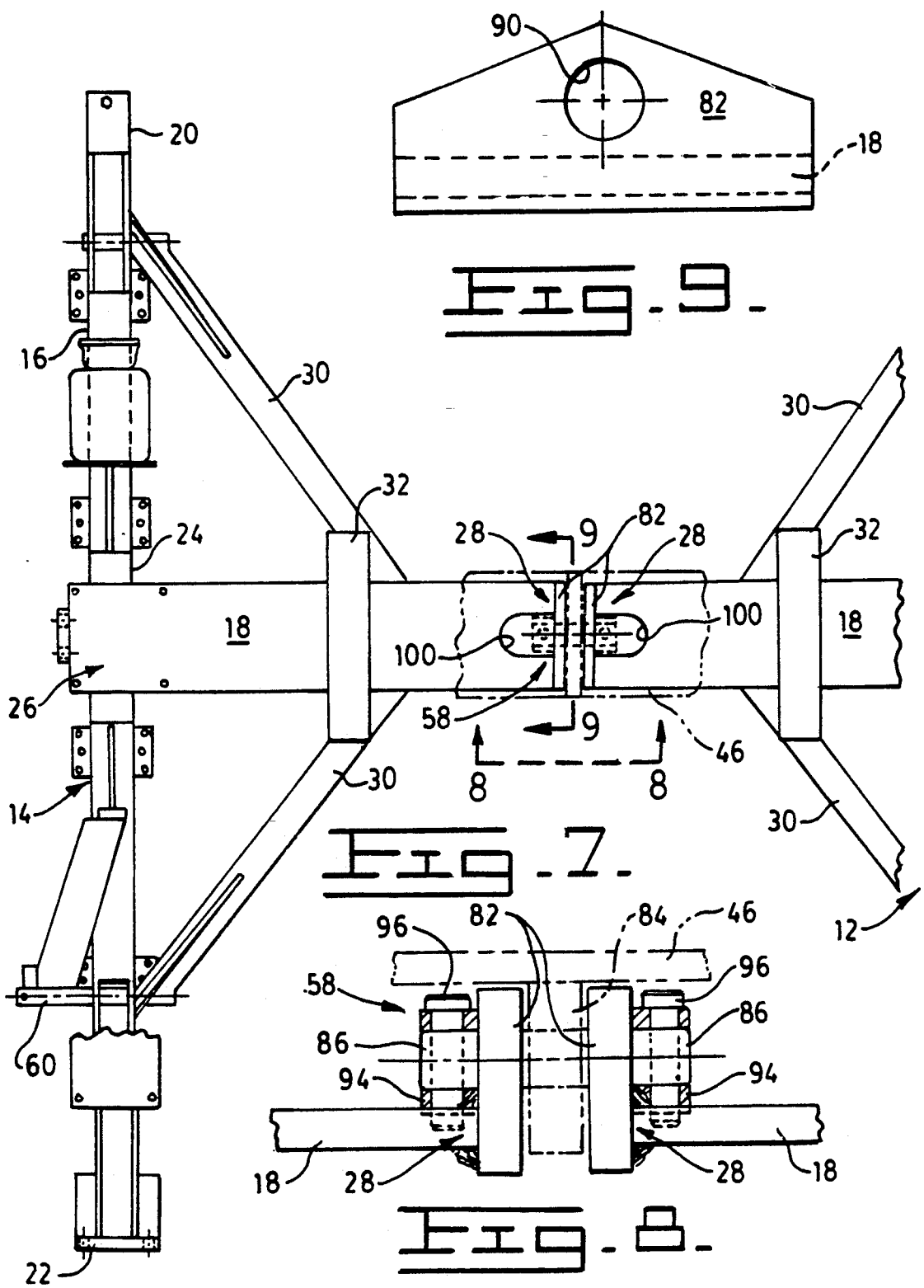

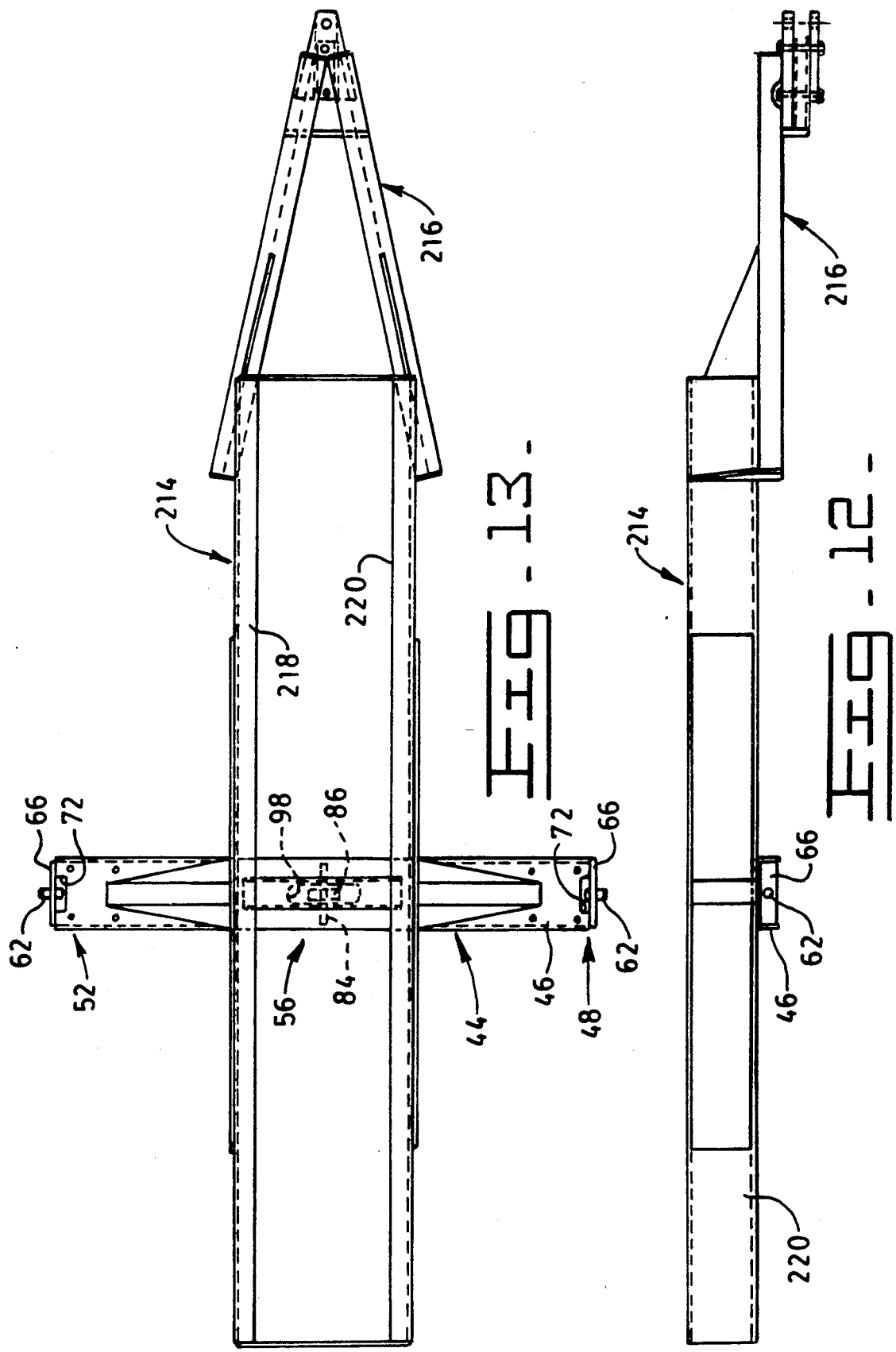

005,286,044

BELTED MULTI-PURPOSE TRAILER

DESCRIPTION

Technical Field

This invention relates generally to a belted trailer vehicle and more particularly to a multi-purpose trailer which is easily and conveniently adaptable to a variety of work applications.

Background Art

Track-type vehicles, which utilize a self-laying endless track undercarriage, have many advantages over wheel type vehicles, including the provisions of lower ground pressure and increased traction. In view of this, track-type vehicles can advantageously operate in wet soil areas and in soils having a large sand content. The track-type undercarriage concept has been further enhanced by replacing the heavy metal track chain with an endless flexible belt arrangement. The belted undercarriage system offers several advantages over the metal track chain, including higher vehicle speed, less maintenance, simplicity of design, and the ability to travel on improved roadways. The belted undercarriage system can also be advantageously applied to non-powered vehicles, such as utility trailers.

One type of non-powered trailer vehicle is shown in U.S. Pat. No. 4,923,257, issued to R. J. Purcell on May 8, 1990. This patent describes a plurality of pivoting arms and fluid cylinders for maintaining the tension on the flexible belt. The load being carried by the vehicle adds to the belt tension. Belt alignment is accomplished by adding or removing one or more adjusting shims between bolted connecting joints of pivoting arms which connect to the wheel assemblies.

While the belted trailer vehicle described in the above noted patent will function quite satisfactory for the purpose intended, the function is limited to a particular type of cargo box or platform. No provisions are available for rapidly and conveniently adapting the belted undercarriage to various work applications. The present invention is directed to overcoming one or more of the problems as set forth above.

Disclosure of the Invention

In one aspect of the present invention, a multi-purpose utility vehicle has first and second roller frame assemblies, with each assembly having first and second frame structures. The second frame structure of each assembly is connected to the middle portion of the first frame structure. The vehicle further includes a support frame and first, second, and third rapid release connecting mechanism for connecting the support frame to the first and second roller frame assemblies. The utility vehicle also has a plurality of wheels and rollers rotatably supported on each roller frame assembly, and a flexible belt encircling the wheels and rollers of each roller frame assembly.

A utility vehicle, such as a trailer, equipped with flexible belted undercarriage assemblies offer several advantages over trailer vehicles equipped with wheels. These advantages would include lower ground pressure, greater traction, and the ability to traverse extremely wet and/or sandy soils. However, in order to fully utilize the advantages of the belted undercarriage on a utility trailer, most farmers would require several of the belted trailer vehicles, since many tasks including grain hauling, fertilizer spreading, sludge hauling, and herbicide spraying are accomplished with utility trailer vehicles.

The subject multi-purpose utility vehicle offers a solution to the problem of needing several belted utility trailers by providing a belted undercarriage and frame structure which can accommodate many different utility boxes. The subject multi-purpose utility vehicle utilizes a plurality of quick release connections to make it rapidly adaptable to various work structures.

BRIEF DESCRIPTION OF THE DRAWINGS

FIG. 1 is a diagrammatic top plan view, partially in section, of the subject multi-purpose utility vehicle;

FIG. 2 is a diagrammatic sectional view taken generally along lines 2—2 of FIG. 1;

FIG. 3 is a diagrammatic side elevational view, with some parts removed, of the utility vehicle shown in 1;

FIG. 5 is a diagrammatic sectional view taken generally along lines 5—5 of FIG. 3;

FIG. 6 is a diagrammatic sectional view taken generally along liens 6—6 of FIG. 3;

FIG. 7 is a diagrammatic top plan view of roller frame assemblies of the present invention;

FIG. 8 is a diagrammatic side elevational view taken generally along lines 8—8 of FIG. 7;

FIG. 9 is a diagrammatic front elevational view taken generally along lines 9—9 of FIG. 7;

FIG. 11 is a diagrammatic front elevational view of a stop plate taken generally along the lines 11—11 of FIG. 10;

FIG. 12 is a diagrammatic side elevational view of a support frame and hitch assembly for use with the subject invention; and FIG. 13 is a diagrammatic top plan view of the support frame and hitch assembly.

BEST MODE FOR CARRYING OUT THE INVENTION

Figure 4:
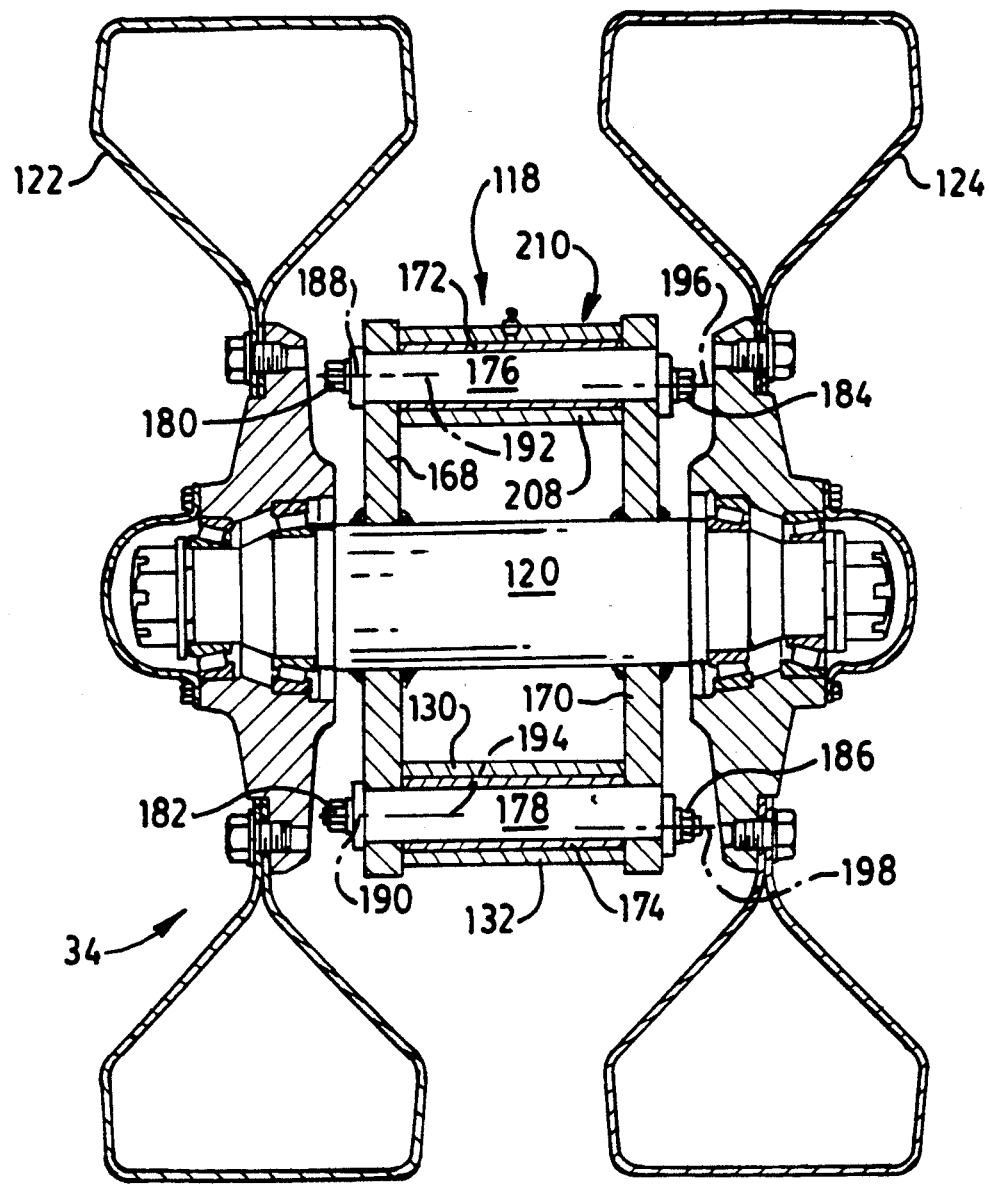
FIG. 4 is a diagrammatic sectional view taken generally along lines 4—4 of FIG. 3.

Referring to the drawings, a belted multi-purpose utility trailer vehicle 10, has first and second T-shaped roller frame assemblies 12,14 with each frame assembly 12,14 having first and second frame members 16,18. Each of the first frame members 16 has first and second end portions 20,22, and a middle portion 24. Each of the second frame members 18 has first and second end portions 26,28, with the first end portions 26 of the second frame members 18 being connected to the respective middle portions 24 of the first frame members 16. These connections form the T-shape of the roller frame assemblies 12,14. The first and second roller frame assemblies 12,14 are substantially similar in construction with one being a right hand frame assembly and the other a left hand frame assembly. A plurality of angled braces 30 connect the first and second frame members 16,18 to strengthen the roller frame assemblies 12,14. One or more cross-braces 32 join the angle braces 30 to each of the second frame members.

The utility trailer 10 further includes first and second wheel assemblies 34,36 which are rotatably connected to the respective first and second end portions 20,22 of each first frame member 16. A plurality of support rollers 38 are rotatably connected to each first frame member 16 between the first and second wheel assemblies 34,36. First and second flexible endless belts 40,42 encircle the wheel assemblies 34,36 and the rollers 38 of the respective first and second roller frame assemblies 12,14.

A main support frame assembly 44 has a cross-beam 46 which overlays the second frame members 18 and serves to join the two roller frame assemblies 12,14 together. The cross-beam 46 has a first end portion 48 which, in conjunction with a first rapid or quick release connecting mechanism 50, connects the cross-beam 46 to the first frame member 16 of the first roller frame assembly 12. The cross-beam 46 has a second end portion which, in conjunction with a second rapid or quick release connecting mechanism 54, connects the cross-beam 46 to the first frame member 16 of the second roller frame assembly 14. The cross-beam 46 also has a middle portion 56 which, in conjunction with a third rapid or quick release connecting mechanism 58, connects the cross-beam 46 to the second end portions 28 of both second frame members 18.

Figure 10:
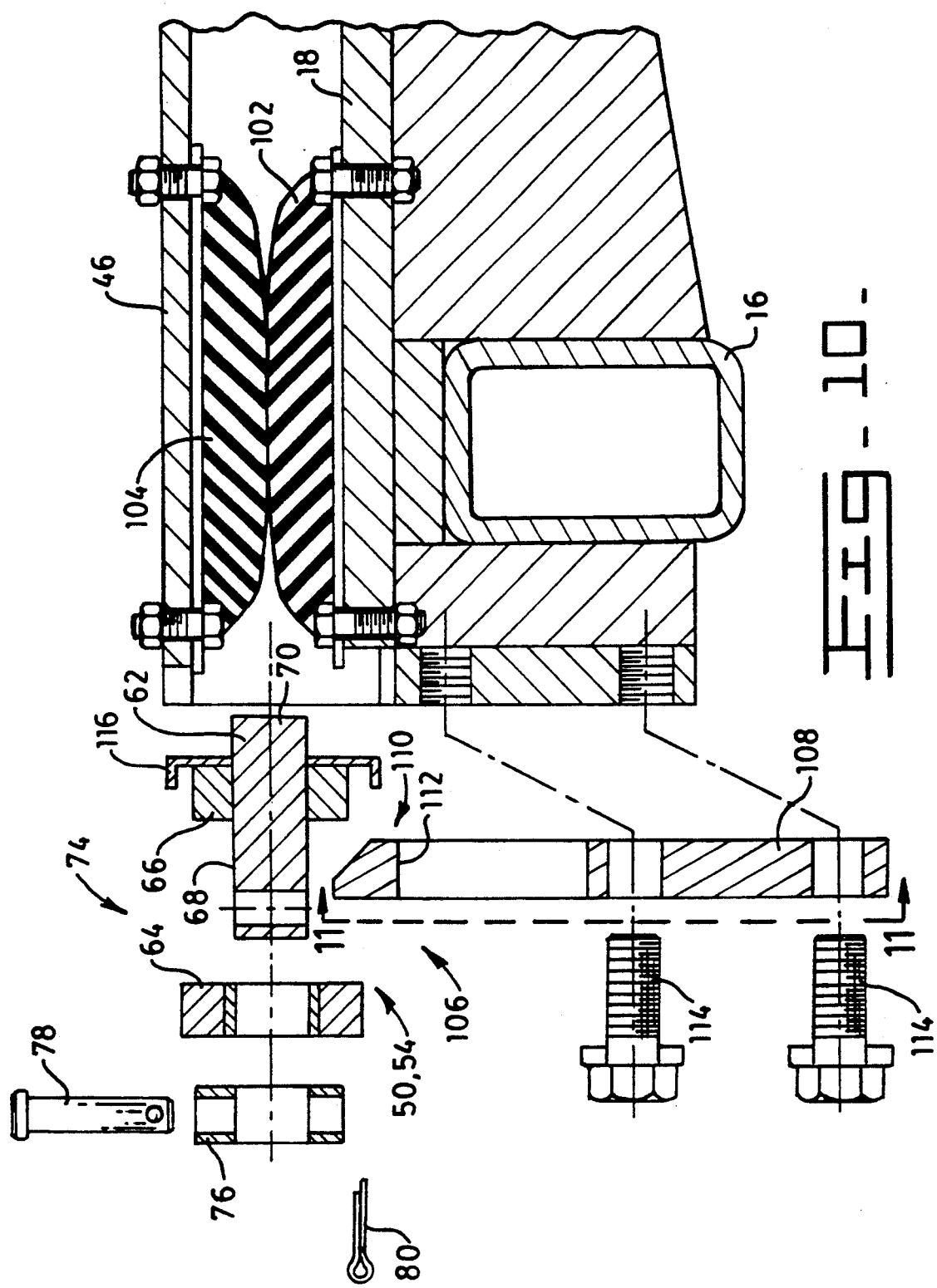
FIG. 10 is a diagrammatic exploded view, with parts in section, taken generally from the area marked 10 of FIG. 2.

With particular reference to FIGS. 1, 2, 7, 10, and 13, each of the first and second quick release connecting mechanisms 50,54, includes a first pin 60 which is secured to first frame members 16, a second pin 62 secured to the cross-beam 46, and an elongated tag link 64 releasably mounted on and extending between the first and second pins 60,62. Each of the second pins 62 penetrates a cross plate 66 and is secured to the cross plate 66 such that a first end portion 68 of each second pin 62 extends outwardly of one side of each cross plate 66, and a second end portion 70 of each second pin 62 extends outwardly of the opposite side of each cross plate 66. Each of the first and second end portions 48,52 of cross-beam 46 defines a U-shaped slot 72, and one of the cross plates 66 is connected to the end portions 48,52 to enclose the U-shaped slot 72. The second end portion 70 of each second pin 62 extends into one of the U-shaped slots 72. The tag link 64 is secured to the first and second pins 60,62 by a securing means 74, with each securing means 74 including a collar 76, a retaining pin 78, and a cotter pin 80.

With particular reference to FIGS. 1, 2, 7, 8, and 9, the third quick release connecting mechanism 58 includes a flange plate 82 secured to each of the second end portions 28 of the second frame members 18, a fastening plate 84 secured to the middle portion 56 of the cross-beam 46, and a cylindrical bar 86 connected to and extending outwardly of each side of the fastening plate 84. Each flange plate 82 has a throughbore 90 and the cylindrical bar 86 is adapted to extend through each of the throughbores 90. A releasable securing means 92, including a collar 94 and a retaining pin 96, secures each of the flange plates 82 to the opposite ends of the cylindrical bar 86. An elongated slot 98 in the cross-beam 46, and a similar elongated slot 100 in the second end portion 28 of each of the second frame members 18, provide easy access to the securing means 92.

A first resilient cushioning member 102 is connected to the first end portion 26 of each second frame member 18, and a similar mating resilient cushioning member 104 is connected to each of the first and second end portions 48,52 of the cross-beam 46. The first cushioning members 102 are adapted to contact the second cushioning members 104 when the main frame assembly 44 is connected to the first and second roller frame assemblies 12,14. The cushioning members 102,104 cooperate to dampen the shock loads applied to the trailer vehicle 10 as it traverses rough or uneven surfaces. In addition to shock dampening, the two mating cushioning members 102,104 allow the track roller frame assemblies 12,14 to pivot without the need for heavily loaded pivot bearings. when the roller frame assemblies 12,14 pivot, the cushioning members 102,104 deform with no relative motion at their interface. Therefore, no expensive sealed pivot bearings are required.

Each of the roller frame assemblies 12,14 is connected to the main support frame assembly 44 by the various pins 62,64 and the cylindrical bar 86. Therefore, each roller frame assembly 12,14 can pivot and oscillate relative to each other and to the main support frame assembly 44. The contact between the first and second resilient cushioning members limits the downwardly directed movement and oscillation while a separate means 106 limits the vertical or upwardly directed oscillation. Each limiting means 106 includes a stop plate 108 having a first end portion 110 and an oblong slot 112 formed in said first end portion 110. One stop plate 108 is removably secured by a plurality of threaded fasteners 114 to the first end portion 26 of each second frame member 18. The first end portion 110 is adapted to extend into the U-shaped slot 72 of the cross-beam 46, and the second end portion 70 of the second pin 62 is positioned within the oblong slot 112. During vertical oscillation, the pin 62 is adapted to contact the stop plate 108 and limit further vertical oscillation. A C-shaped wear plate 116 is positioned between the stop plate 108 and the cross-plate 66.

With particular reference to FIGS. 1, 3, 4, 5, and 6, each of the first wheel assemblies 34 includes a swing link assembly 118, a spindle 120 which is non-rotatably connected to the swing link assembly 118 and first and second spaced wheels 122,124 rotatably mounted on the spindle 120. A first means 126 provides for pivoting the swing link assembly 118 and each first wheel assembly 34. A second means 128 provides for locking the first means 126 in any adjusted position. The first means 126 includes a connecting lever 130 which has a first end portion 132 connected to the swing link assembly 118, and a second end portion 134 which is enclosed within the first frame member 16. The second end portion 134 has first and second side surfaces 136,138 which are engaged respectively by first and second threaded adjusting screws 140,142. The adjusting screws 140,142 are threadably secured to the first frame member 16 by first and second threaded bushings 144,146 which are welded or otherwise permanently connected to the first and second sides 148,150 of the first frame member 16. The screws 140,142 are adapted to bear against the respective first and second side surfaces 136,138 of the connecting lever 130 as they are threaded into the respective threaded bushings 144,146. As one or the other adjusting screws 140,142 are tightened against the connecting lever 130, the lever 130 pivots about a threaded fastener 162. This changes the angle of the wheel assembly 34 relative to the belt 40 to provide an alignment function. The threaded fastener 162, a nut 164, and a spacer 166 hold the lever 130 within the first frame member 16.

The second locking means 128 includes first and second threaded sleeves 152,154 which are adapted to threadably engage the respective first and second adjusting screws 140,142. Each sleeve 152,154 has a shoulder 156 which is adapted to contact the bushings 144,146 and provide a clearance gap 158 between the bushings 144,156 and the sleeves 152,154. A connecting member 160, such as a threaded bolt 160, connects the first sleeve 152 to the second sleeve 154. As the connecting member 160 is tightened, the sleeves 152,154 are slightly cocked and jammed onto the set screws 140,142. This prevents the sleeves 152,154 from rotating and the induced frictional force prevents the set screws 140,142 from turning and loosening.

The swing link assembly 118 includes first and second spaced ear plates 168,170, first and second sleeves 172,174 positioned between the ear plates 168,170, and first and second pivot pins 176,178 which are adapted to penetrate the first and second plates 168,170 and the first and second sleeves 172,174 respectively, and to interconnect the first plate 168 to the second plate 170. First and second threaded fasteners 180,182 join the first and second pivot pins 176,178 respectively to the first ear plate 168 and third and fourth threaded fasteners 184,186 join the first and second pivot pins 176,178 respectively to the second ear plate 170. The axis 188,190 of the first and second threaded fasteners 180,182 are in substantial alignment with the respective central axis 192,194 of the first and second pivot pins 176,178. However, to prevent the pivot pins 176,178 from rotating during movement of the swing link assembly 118, the axis 196,198 of the third and fourth threaded fasteners 184,186 are offset from the respective central axis 192,194 of the first and second pivot pins 176,178.

With particular reference to FIGS. 1,3, and 7, a recoil and belt tensioning mechanism 200 for each of the flexible belts 40,42 includes an air spring 202 having first and second end portions 204,206 and a recoil link 208 having first and second end portions 210,212. The first end portion 204 of the air spring 202 is connected to the first frame member 16 and the second end portion 206 is connected to the second end portion 212 of the recoil link 208 which is connected by the pivot pin 176 to the swing link assembly 118 and thereby to the first wheel assembly 34.

With particular reference to FIGS. 12 and 13, the subject trailer vehicle 10 can be provided with an auxiliary frame assembly 214 and a hitch assembly 216 if so desired. If the vehicle 10 is so equipped, the frame rails 218,220 are spaced at a common or standard spacing to accommodate various truck mounted equipment.

INDUSTRIAL APPLICABILITY

With reference to the drawings, the subject belted multi-purpose trailer vehicle 10 is particularly useful for farm type applications where many different types of trailer vehicles are required to perform different work functions. The subject trailer vehicle 10 with belted undercarriage can accommodate a plurality of trailer or truck beds, therefore eliminating the need for a plurality of complete separate trailer-type vehicles.

The first, second, and third quick release connecting mechanism 50, 54, and 58 provide quick and easy connection of the undercarriage, including first and second roller frame assemblies 12,14, to a main support frame assembly 44. To assemble the first and second roller frame assemblies 12,14 to the frame assembly 44, the stop plate 108 is first removed from each of the first frame members 16. The flange plates 82 are then engaged with the cylindrical bar 86 of the cross-beam 46 and the collars 94 and retaining pins 96 are attached to each end of the cylindrical bar 86, thereby securing the roller frame assemblies 12,14 to the middle portion 56 of the cross-beam 46. The slotted stop plates 108 are now re-attached to the second frame members 18 by the threaded fasteners 114. The tag links 64 are then connected to the first and second pins 60,62 and secured thereto by the collars 76 and retaining pins 78. The assembly procedure is now complete and the roller frames 12,14 are securely connected to the support frame assembly 44.

Disassembly would be substantially the reverse of the above described procedure.

Other aspects, objects, and advantages of this invention can be obtained from a study of the drawings, the disclosure, and the appended claims.

We claim:
1. A belted multi-purpose utility trailer, comprising:
first and second T-shaped roller frame assemblies, each having first and second frame members, said first frame members having first and second end portions and a middle portion, said second frame members having first and second end portions, said first end portions of said second frame members being adapted to be connected respectively to said middle portions of said first frame members;
first and second wheel assemblies adapted to be rotatably connected to respective first and second end portions of each first frame member;
a plurality of rollers adapted to be rotatably connected to each first frame member between said first and second wheel assemblies;
first and second flexible endless belts encircling the wheel assemblies and rollers respectively of the first and second roller frame assemblies;
a main frame assembly having a cross-beam having first and second end portions and a middle portion;
first and second quick release connecting mechanisms adapted to connect said cross-beam first and second end portions respectively to said first frame members of respective first and second roller frame assemblies, said first and second quick release connecting mechanisms each include a first pin secured to said first frame member, a second pin having first and second end portions and secured to said cross-beam, an elongated tag-link releasably mounted on and extending between said first and second pins, and means for securing said tag-link to said first and second pins; and
a thick quick release connecting mechanism adapted to connect the second end portions of said second frame members to the middle portion of said cross-beam.

2. A multi-purpose utility trailer, as set forth in claim 1, wherein said third quick release connecting mechanism includes a flange plate secured to each second end portion of said second frame members, each flange plate having a throughbore, a fastening plate secured to said middle portion of said cross-beam, said fastening plate having first and second bars connected thereto, each of said bars being adapted to extend through one of said throughbores, and means for releasably securing said flange plates to said first and second bars respectively.

3. A multi-purpose utility trailer, as set forth in claim 1, including means for limiting the vertical oscillation between each of said roller frame assemblies and said main frame assembly.

4. A multi-purpose utility trailer, as set forth in claim 3, wherein each of said oscillation limiting means includes a stop plate removably secured to the first end portions of each second frame member, each stop plate having an oblong slot, and said second end portion of each of said second pins being positioned within one of said oblong slots.

5. A multi-purpose utility trailer, as set forth in claim 4, wherein each of said oscillation limiting means includes a U-shaped slot defined by each of the first and second end portions of said cross-beam and a cross plate connected to said cross-beam end portions and enclosing said slot, said second pin being connected to said cross plate and said second end portion of said second pin extending outwardly of said cross plate and into said U-shaped slot.

6. A multi-purpose utility trailer, as set forth in claim 5, wherein said stop plate has a first portion, said first portion being adapted to extend into said U-shaped slot.

7. A multi-purpose utility trailer, as set forth in claim 1 including a cross plate connected to the first and second end portions of said cross-beam and each of said second pins is connected to one of said cross plates, said second end portion of each second pin extending outwardly of said respective cross plate.

8. A multi-purpose utility trailer, as set forth in claim 1, including a first resilient cushion connected to the first end portion of each second frame member, and a second resilient cushion connected to each of the first and second end portions of said cross-beam, said first cushions being adapted to contact said respective second cushions when said main frame is connected to said first and second roller frame assemblies.

9. A multi-purpose utility trailer as set forth in claim 1, wherein each of said first wheel assemblies includes a swing link assembly, a spindle non-rotatably connected to said swing link assembly, first and second wheels rotatably mounted on said spindle, and means for pivoting said swing link assembly and said wheel assembly relative to said respective first end portion of said first frame member, and means for locking said pivoting means in a plurality of adjusted positions.

10. A multi-purpose utility trailer, as set forth in claim 9, wherein said means for pivoting said swing link assembly include a connecting link having a first end portion connected to said swing link assembly and a second end portion enclosed within said first frame member, said second end portion having first and second side surfaces, and first and second threaded adjusting pins secured to said first frame member and adapted to bear against respective first and second side surfaces.

11. A multi-purpose utility trailer, as set forth in claim 10, wherein said locking means includes first and second threaded sleeves threadably engaged by respective first and second adjusting pins and a connecting member connecting said first sleeve to said second sleeve, said connecting member being adapted to deflect said first and second sleeves and lock said sleeves against said adjusting pins.

12. A multi-purpose utility trailer, as set forth in claim 9, wherein said swing link assembly includes first and second spaced ear plates, first and second sleeves positioned between said ear plates, first and second pivot pins adapted to penetrate said first and second plates and said first and second sleeves respectively, and first and second threaded fasteners joining said first and second pivot pins respectively to said first ear plate, and third and fourth threaded fasteners joining said first and second pivot pins respectively to said second ear plate, the axis of said first and second threaded fasteners being in substantial alignment with the respective central axis of said first and second pivot pins, and the axis of said third and fourth threaded fasteners being offset from the respective central axis of said first and second pivot pins.

13. A multi-purpose utility trailer, as set forth in claim 1, including a recoil and belt tensioning mechanism for each of said flexible belts, each mechanism including an air spring having first and second end portions, and a recoil link having a first end portion connected to said first wheel assembly and a second end portion connected to said second end portion of said air spring, said first end portion of said air spring being connected to said first frame member.

14. A multi-purpose utility vehicle, comprising:
first and second roller frame assemblies, each assembly having a first frame structure having first and second end portions and a middle portion, and a second frame structure having first and second end portions, said second frame structure first end portions being adapted to be connected to respective middle portions of said first frame structures;
a plurality of wheels and rollers rotatably connected to each of the first and second roller frame assemblies;
a flexible endless belt adapted to encircle the wheels and rollers of each roller frame assembly;
a support frame, including a cross-beam having first and second end portions and a middle portion,
a first rapid release connecting mechanism adapted to connect the first end portion of said cross beam to one of said first frame structures;
a second rapid release connecting mechanism adapted to connect the second en portion of said cross-beam to the other of said first frame structures, each of said first and second rapid release connecting mechanisms including a first connecting pin secured to said first frame structure, a second connecting pin secured to said cross-beam, and an elongated tag-link connecting said first and second connecting pins; and
a third rapid release connecting mechanism adapted to connect the second end portions of said second frame structures to the middle portion of said cross-beam.

15. A multi-purpose utility trailer, as set forth in claim 14, wherein said third rapid release connecting mechanism includes a flange plate secured to each second end portion of said second frame structures, first and second connecting bars secured to the middle portion of said cross-beam, and means for releasably securing said flange plates to respective first and second connecting bars.

16. A multi-purpose utility trailer, as set forth in claim 14, including means for limiting the vertical oscillation between each of said roller frame assemblies and said support frame, said limiting means including a stop plate secured to the first end portion of each second frame structure, each stop plate having an oblong slot therein, and a portion of said second connecting pin being positioned within said oblong slot.

17. A belted multi-purpose utility trailer, comprising:
first and second T-shaped roller frame assemblies, each having first and second frame members, said first frame members having first and second end portions and a middle portion, said second frame members having first and second end portions, said first end portions of said second frame members being adapted to be connected respectively to said middle portions of said first frame members;

first and second wheel assemblies adapted to be rotatably connected to respective first and second end portions of each first frame member;

a plurality of rollers adapted to be rotatably connected to each first frame member between said first and second wheel assemblies;

first and second flexible endless belts encircling the wheel assemblies and rollers respectively of the first and second roller frame assemblies;

a main frame assembly having a cross-beam having first and second end portions and a middle portion;

first and second quick release connecting mechanisms adapted to connect said cross-beam first and second end portions respectively to said first frame members of respective first and second roller frame assemblies; and a third quick release connecting mechanism adapted to connect the second end portions of said second frame members to the middle portion of said cross-beam, said third quick release connecting mechanism including a flange plate secured to each second end portion of said second frame members, each flange plate having a throughbore, a fastening plate secured to said middle portion of said cross-beam, said fastening plate having fist and second bars connected thereto, each of said bars being adapted to extend through one of said throughbores, and means for releasably securing said flange plates to said first and second bars respectively.

18. A multi-purpose utility vehicle, comprising:

first and second roller frame assemblies, each assembly having a first frame structure having first and second end portions and a middle portion, and a second frame structure having first and second end portions, said second frame structure first end portions being adapted to be connected to respective middle portions of said first frame structures;

a plurality of wheels and rollers rotatably connected to each of the first and second roller frame assemblies;

a flexible endless belt adapted to encircle the wheels and rollers of each roller frame assembly;

a support frame, including a cross-beam having first and second end portions and a middle portion, a first rapid release connecting mechanism adapted to connect the first end portion of said cross beam to one of said first frame structures;

a second rapid release connecting mechanism adapted to connect the second end portion of said cross-beam to the other of said first frame structures; and a third rapid release connecting mechanism adapted to connect the second end portions of said second frame structures to the middle portion of said cross-beam, said third rapid release connecting mechanism including a flange plate secured to each second end portion of said second frame structures, first and second connecting bars secured to the middle portion of said cross-beam, and means for releasably securing said flange plates to respective first and second connecting bars.

* * * * *